United States Patent Office 3,548,454
Patented Dec. 22, 1970

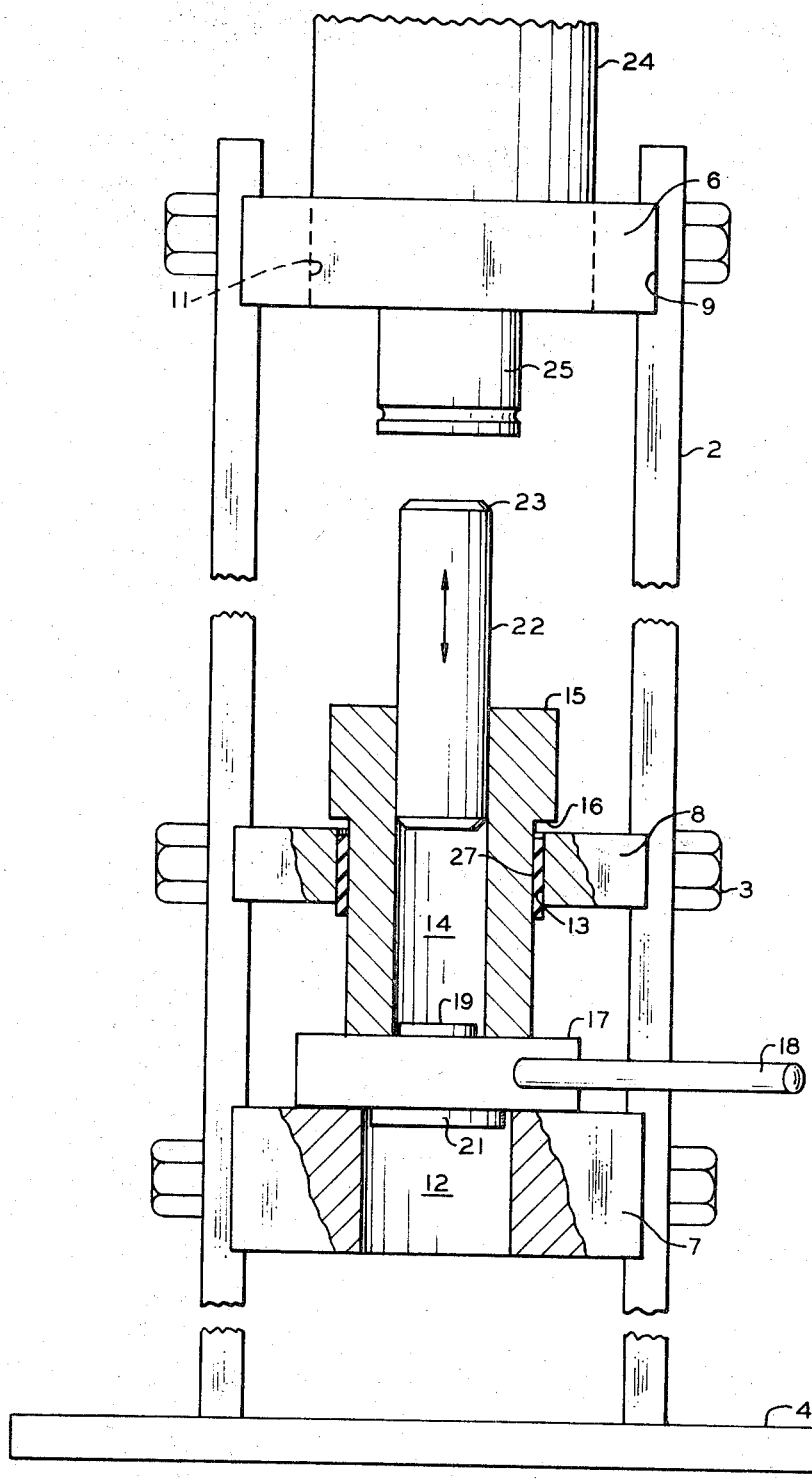

3,548,454
COMPACT PRESS
Robert H. Kallenberger, Robert E. Dollinger, John W. Byron, and Eulas W. Henderson, Borger, Tex., assignors to Phillips Petroleum Company, a corporation of Delaware
Filed May 20, 1968, Ser. No. 730,238
Int. Cl. B30b 7/00
U.S. Cl. 18—16                                9 Claims

ABSTRACT OF THE DISCLOSURE

A compact, easily operated press is provided which consists of a cylinder and piston mounted below a pressure providing means, wherein relatively small amounts of a particulate sample can be subjected to a pressure in the range of from 15,000–30,000 p.s.i. The press features unique means of alignment of the component parts to insure that the high compression does not result in galling of the piston and cylinder.

FIELD OF THE INVENTION

This invention relates to small compact presses which are able to subject relatively small amounts of a granular or powder form sample to high pressures. In another aspect, it relates to apparatus for subjecting carbon black to a pressure in the range of from 15,000 to 30,000 p.s.i. In a further aspect, it relates to apparatus which is designed to compress carbon black prior to subjecting carbon black to the ASTM D2414–67T dibutylphthalate absorption test in order to get an accurate indication of the black structure.

BACKGROUND OF THE INVENTION

For many years those in the carbon black industry and those in the rubber industry have utilized the ASTM D2414–67T DBP absorption test to determine the structure of carbon black. Structure refers to the force as responsible for agglomeration, that is they are particle-to-particle (dispersion) forces. Because of the particular nature of carbon, it is necessary to measure the effects of these agglomerative forces by indirect methods. The ASTM procedure mentioned above has been widely accepted as the standard test by the carbon black and rubber industries in determining structure, this specification having become critical for both producers of carbon black and those who use carbon black, especially in the fabrication of natural and synthetic rubber automotive tires. The basic importance of the structure property of carbon black in rubber compounding results from the fact that it is this property which determines the reduction in nerve of an elastomer when the two are mixed together. The reduction in nerve reduces shrinkage when an elastomer is extruded through a die; hence, one measure of the effect of structure upon the elastomer is extrusion shrinkage or die swell.

It was reported before the American Chemical Society, Division of Rubber Chemistry meeting, Sept. 13–16, 1966, at New York, N.Y., in a paper by R. E. Dollinger, R. H. Kallenberger, and M. L. Studebaker, entitled "The Effect of Carbon Black Densification of Structure Measurements in Rubber Properties" that the test results obtained by conventional methods to determine carbon black structure were very dependent upon the previous history of the sample, that is, by the amount of mechanical work performed on the sample prior to the test. The authors reported that a direct relationship could be shown between carbon black structure and an extrusion shrinkage of the elastomer if the carbon black was subjected to repeated high pressure compression prior to running the standard ASTEM D2414–67T DBP absorption procedure. Accordingly, it became desirable for the industry to develop a press which would enable small samples of carbon black to be compressed in the range of 15,000 to 30,000 p.s.i. in order that the sample might be prepared for running the above ASTM DBP absorption test. Utilization of compression prior to determining the structure of the black enables the rubber fabricator to predict the effect of structure on the resulting extrusion shrinkage of the rubber-carbon black mixture.

DESCRIPTION OF THE PRIOR ART

Due to the fact that the compression of the carbon black sample prior to running the DBP absorption test is to be used under laboratory conditions, it became immediately clear that the conventional presses of the prior art were not suitable for the compression of the carbon black. Compression of the samples using large conventional presses such as are found in machine shops were entirely unsatisfactory in that a piston utilized to compress a sample which was held within a cylinder tended to gall or freeze together the friction surfaces of the cylinder and piston. This phenomena rendered the cylinder and piston unsuitable for subsequent use in compressing further samples. Furthermore, it was deemed highly desirable to have a press which could be manipulated easily by any laboratory technician wherein repeated pressings could be made of various samples over a period of time. Accordingly, it was desired to develop a compact press having the features of easy operability, absence of galling of the high friction surfaces, and one which would allow repeated and reproducible pressing of various samples by different operators.

SUMMARY OF INVENTION

We have discovered a compact carbon black press which overcomes the above deficiencies and those of the prior art. Briefly, the press of the invention consists of a cylinder and piston mounted in a suitable framing device which enables a pressure providing means having a plunger therein to force the piston through the internal diameter of the cylinder thereby compressing a carbon black sample which has been placed in the cylinder. The design of the press provides an unique means of alignment of the cylinder in a cylinder support guide plate which insures that the piston will traverse the length of the internal bore of the cylinder without galling of the surfaces of the cylinder and piston. Furthermore, the design of the instant invention provides a unique means of alignment of the cylinder within the apparatus which enables the cylinder and piston to be removed from the apparatus and replaced once again while insuring the alignment is maintained. Another feature of the invention resides in the bottom seal plate upon which the carbon black sample is compressed. This plate is provided with a handle which allows the operator to easily manipulate a carbon black sample for repeated compressions thereof. The bottom seal plate is also provided with an alignment means on the upper and lower surfaces thereof which insures that the plate is in proper position in order to proceed with the pressing of the black.

OBJECTS OF THE INVENTION AND BRIEF DISCUSSION OF THE DRAWING

Accordingly, it is an object of this invention to provide a press which enables repeated compression of particulate or powdered samples to high pressures.

It is a further object of the invention to provide a compact press having a removable cylinder and piston mounted below a pressure providing means having a plunger, wherein the cylinder and piston can be easily removed from the apparatus and replaced once again while insuring proper alignment of the component parts to insure the absence of galling in the operation of the press.

It is a further object of the invention to provide a carbon black press wherein carbon black is subjected to high pressures, which provides a plate upon which the carbon black is pressed which is easily removable from the press but which can be replaced easily while insuring proper alignment of the component parts.

Other objects and advantages of the present invention will be more apparent from a reading of the following disclosure, claims and the drawing, wherein the sole figure is a cutaway perspective view of the apparatus of the invention.

DESCRIPTION OF THE PREFERRED EMBODIMENTS

The press of the invention and the operation thereof can best be understood by a detailed description of the sole figure of the drawing. Referring to the figure of the drawing, the press of the invention consists of a pair of upstanding sides 2 which are mounted on base 4. Sides 2 are provided with grooves 9 which enable three crossplates or guide plates to be fastenend by bolts 3 to the sides 2. The three crossplates are therefore mounted at right angles to sides 2. The upper plate 6 is a pressure providing mounting block which has opening 11 therein which is adapted to receive the pressure providing means 24. The lower plate 7 is a bottom plate having an opening 12 therein. Plate 8 located intermediate plate 6 and plate 7 is a cylinder support means having an opening 13 therein, opening 13 being designed to receive cylinder 15. Cylinder 15 is easily removable from the opening 13 in plate 8, and has a circumference of the outer surface at its upper portion greater than the circumference at its lower portion, thereby forming flange 16. The interior bore 14 of cylinder 15 is continuous throughout the length of cylinder 15.

Cylinder 15 immediately below flange 16 is provided with a flexible ring 27 which is continuous about the circumference of the outer surface of the lower portion of cylinder 15 so that when the cylinder is in place in cylinder guide plate 8, the flexible ring contacts the surfaces of opening 13 within cylinder guide plate 8. The flexible ring may be made of natural or synthetic rubbers or plastics. The flexible ring 27 upon cylinder 15 assures that proper alignment is maintained during the pressing operation in that the ring provides a limited amount of freedom of motion with regard to the position of cylinder 15 upon the bottom seal plate. Accordingly, cylinder 15 has a minimum amount of freedom of movement in a horizontal direction thereby preventing the piston from scraping the surface of bore 14.

The interior surface of bore 14 and the exterior surface of piston 22 are aligned in such a way that when plunger 24 exerts a downward force, the piston 22 travels the length of bore 14. The composition of the cylinder and that of the piston are of certain critical compoistions which is hereinafter explained. The ends of cylinder 22 at the edges thereof are beveled as shown by numeral 23. This insures easy insertion of piston 22 into the bore 14 of cylinder 15.

The lower portion of cylinder 15 rests upon bottom seal plate 17. Bottom seal plate 17 is conveniently provided with a handle 18 which protrudes from the lateral edge of seal plate 17. The seal plate is also provided with a raised portion 19 which has the same geometrical configuration as the interior bore 14 of cylinder 15. The lower portion of bottom seal plate 17 is provided with a raised portion 21 which has the same geometrical configuration as opening 12 in bottom plate 7. Raised surfaces 19 and 21 on seal plate 17 provide a means of proper alignment of the bottom of the cylinder 15 so that actuation of plunger 25 against piston 22 to force the piston throughout the length of bore 14 will not gall or freeze the high friction surfaces in the lower portion of bore 14. The raised surfaces also insure that the operator of the press may remove and replace sead plate 17 in the proper alignment with respect to cylinder 15. It is to be noted that the dimensions of surfaces 19 and 21 are less than the dimensions of bore 14 and opening 12. This is in accordance with the requirement that cylinder 15 have a limited freedom of movement in a horizontal direction which is provided by ring 27. Accordingly, the tolerance between the lateral edge of surface 19 and the surface of bore 14 is greater than the tolerance between the lateral edge of surface 21 and the surface of opening 12.

In operation, the press of the invention is designed to subject a carbon black sample placed into bore 14 of cylinder 15 to a pressure in the range of from 15,000 to 30,000 p.s.i., preferably 24,000 p.s.i. At the start of the operation, plunger 25 will be in a retracted position. Piston 22 is then removed from cylinder bore 14, cylinder 15 is removed from opening 13 in cylinder guide plate 8, and bottom seal plate 17 is removed from the opening 12 in bottom plate 7 by means of handle 18. Bore 14 of cylinder 15 may then be cleaned with a suitable cleaning means, for example by passing a cloth through the bore. The surface of piston 22 may then likewise be cleared by wiping off the piston.

To precompress a sample of carbon black prior to running the ASTM D2414–67T DBP absorption test, the bottom seal plate 17 is placed into opening 12 of bottom plate 7 by means of handle 18. The clean cylinder is then inserted into opening 13 of cylinder guide plate 8 in such a way that it rests upon bottom seal plate 17 with raised surface 19 of bottom seal plate 17 projecting into the lower portion of bore 14. This assures the proper alignment of the cylinder so that when plunger 25 forces piston 22 through the length of bore 14, galling of the surfaces of piston 22 and interior bore 14 is prevented.

Twenty-five grams of carbon black sample which is dried to 220° F. for one hour are then poured into cylinder bore 14. Piston 22 is then inserted into the upper portion of bore 14 and pushed downward as far as possible through the length of bore 14 of cylinder 15 by hand. The plunger means is then activated. The lower surface of plunger 25 is brought into contact with piston 22 thereby pressing the carbon black sample in bore 14 to a compression of, for example, 24,000 p.s.i. which is read upon a standard pressure gauge. The pressure is held approximately 3 seconds and the plunger activation mechanism is released.

The operator then grasps the upper portion of cylinder 15 with one hand, lifting it slightly and with his other hand removes bottom seal plate 17 by means of handle 18. When plate 17 is removed, cylinder 15 rests on cylinder guide plate 8 by means of flange 16. The carbon black sample will usually remain entrained within the bore 14 even though bottom seal plate 17 has been removed. A small pan is placed upon base 4 immediately below the opening 12 in bottom plate 7. Any carbon black present on surface 19 may be suitably transferred to the pan located on base 4. The plunger is then once again activated forcing piston 22 throughout the length of bore 14 which causes the majority of pressed sample to fall into the pan located on base 4. It should be noted that the carbon black sample present within bore 14 does not form a pill or extensively cake. Even after compression this carbon black sample is of relatively loose agglomerates, and even if a pelletized carbon black sample is pressed, the resulting pressed carbon black does not remain in a pill type form.

Piston 22 may then be once again wiped clean and the cylinder lifted slightly reinserting bottom seal plate 17 into the proper aligned position. The carbon black sample which has been pressed once is then reinserted into bore 14 and given three more pressings according to the procedure mentioned immediately above. After a total of four pressings, the sample is ready for ASTM 2414–67T DBP absorption.

Since the press is designed primarily for laboratory usage, the overall dimensions of the press will be generally in the range of that which is easily mounted in the laboratory. Accordingly, the overall height of the press including the plunger means will generally be in the range of from 2½ feet to 4 feet in height. The distance between the sides 2 will be in the range of from 4 to 10 inches. It is apparent however that these dimensions are not critical to the design of the invention.

However, there are certain critical specifications that are required to successfully operate the press of the invention. The first of these is in the nature of the surfaces of bore 14 and piston 22. We have found that a successful operation of the press in the absence of galling or freezing of the walls of the piston and cylinder is dependent upon the compositions of the surfaces and their respective Rockwell hardnesses. The Rockwell hardness of a metallic surface is determined by ASTM procedure E18–61. The surface of bore 14 and the surface of piston 22 must be different. Accordingly, the piston may be made of any well known steel conventional in the art, however, it must have a Rockwell hardness in the range of 50 to 70 C., preferably 60 C. The interior surface of bore 14 may also be made of any conventional metal or metal alloy different from the material of the piston wherein a Rockwell hardness of 20 to 45 C., preferably 28 to 30 C., is provided.

Preferably, the piston is coated with a metallizing compound such as Metco–16C, a commercial preparation by Metco, Inc. This coating is flame flux applied by an electric arc, this method of application being well known in the metal industry. The metallizing compound coating consists of 77 percent nickel, 16 percent chrome, .5 percent carbon, 2.5 percent iron, 4 percent silicon, 4 percent boron, 3 percent copper and 3 percent molybdenum. Preferably, the cylinder is made of a steel having the following composition of other materials: .40–.48 percent carbon, .15–.30 percent silicon, .24–.33 percent sulfur, 1.35 percent to 1.65 percent manganese, and 0.00 to 0.4 percent of phosphorus.

The second critical specification which is deemed necessary to insure adequate operation of the press of the invention is that the diameter of piston 22 must be in the range of 0.00150 to 0.00350 inch less than the diameter of bore 14 of cylinder 15. Preferably, the tolerance between the surface of piston 22 and the surface of bore 14 is in the range of 0.00240 to 0.00250 inch. When these specifications are met, the activation of plunger 25 upon the surface of piston 22 insures that the piston will travel the length of bore 14 without galling of the surfaces of the piston and that of bore 14 of cylinder 15. These specifications also insure that the carbon black sample present in bore 14 will not excessively bleed into the opening between the surface of piston 22 and the surface of bore 14.

The pressure providing means utilized to force piston 22 through bore 14 of cylinder 15 can be any well known pressure providing apparatus. It is preferred that the pressure providing means be a hydraulic cylinder fitted with a suitable plunger and activated by means of a power or hand operated pump. The plunger speed may vary over a relatively broad range, however, it is preferred that its speed be within the class of hydraulic cylinders known in the industry as possessing a medium plunger speed rather than a fast or slow speed. Of particular utility is a hydraulic cylinder commercially available from Blackhawk Industrial Products Co., division of Applied Power Industries, Inc., having a 2 inch plunger with an 8 inch stroke, and an effective area 5.157 square inches. It is within the scope of the invention to utilize compressed gases, for example nitrogen, to provide the pressure which activates plunger 25.

Other modifications and variations in the invention are possible without departing from the spirit and scope of the invention. In particular, it is possible to utilize the apparatus for pressing other particulate type materials than that of carbon black. Furthermore, it is within the scope of the invention to modify the shape of piston 22 and bore 14; however, a cylindrical configuration is preferred. It should be understood that the use of the term "cylinder" to describe the structure through which bore 14 traverses is not intended to limit the shape of the structure (15) to a cylinder in configuration.

It is also within the scope of the invention to utilize a piston which has a reduced cross section at the intermediate portion thereof. Accordingly, the piston would be I-shaped when viewed in longitudinal section. If such a piston is employed, it is essential that the lower portion of the surface of the piston which bears on the surface of the cylinder bore be sufficient to prevent horizontal motion of the piston as it travels through the cylinder bore. Generally, the surface area required will be in the range of 20–50 percent with respect to the length of the piston. Expressed in different terms, the portion of the piston which has a reduced cross-sectional area will be in the range of 50–80 percent with respect to the length of the piston.

We claim:

1. A press capable of subjecting a relatively small sample of powdered or particulate material to high pressure which comprises in combination
   (a) a pair of upstanding parallel sides supported on a base, having attached thereto at right angles:
      (1) means for mounting a pressure providing means in the upper portion of said sides;
      (2) supporting means located in the lower portion of said sides and having centrally located therein means defining an opening;
   (b) a cylinder having a smooth continuous bore throughout its length;
   (c) a bottom seal means having a raised portion on the upper surface thereof which is adapted to fit into the lower portion of said bore of said cylinder, and having a raised portion on the lower surface thereof which is adapted to fit into the means defining an opening of said supporting means;
   (d) a piston, said piston having the same substantially geometrical configuration as the bore of said cylinder and being of sufficient length to traverse the entire length of said bore of the cylinder; and
   (e) a pressure providing means mounted in said mounting means and having a plunger means capable of forcing said piston throughout the length of said bore to provide pressure upon said sample located in said bore.

2. A press according to claim 1 further including a guiding means attached at right angles to said sides located intermediate (1) and (2) and having centrally located therein means defining an opening, said cylinder is adapted to be mounted in said means defining an opening of said guiding means so that the cylinder is easily removable from said guiding means, and the attachment of (1), (2) and said guiding means to said sides is provided by means of grooves in said sides.

3. A press according to claim 2 wherein the outer circumference of said cylinder is greater at the upper portion thereof than the circumference of the lower portion thereby defining a flange means which supports said cylinder in a vertical position when said cylinder is placed in said means defining a circular opening of said guiding means; said cylinder being fitted with a flexible ring immediately below said flange so that when said cylinder is supported in said guiding means said ring contacts said means defining an opening in said guiding means thereby providing proper alignment of said cylinder with respect to said piston.

4. A press according to claim 3 wherein the bore of said cylinder has a Rockwell hardness in the range of 20 to 40 C., and the surface of said piston has a Rockwell hardness in the range of 50 to 70 C.

5. A press according to claim 4 wherein the composition of the cylinder consists of steel having in the range of .40–.48 percent carbon, .15–.30 percent silicon, .24–.33 percent sulfur, 1.35 to 1.65 percent manganese, and 0.00 to 0.40 percent phosphorus; and said piston is coated with a metallizing compound consisting of 77 percent nickel, 16 percent chrome, .5 percent carbon, 2.5 percent iron, 4 percent silicon, 4 percent boron, 3 percent copper, and 3 percent molybdenum.

6. A press according to claim 5 wherein said bore of said cylinder and said piston are cylindrical and said piston has a diameter of 0.00150 to 0.00350 inch less than the bore of said cylinder.

7. A press according to claim 6 wherein said pressure providing means is capable of subjecting said sample to a pressure in the range of from 15,000 to 30,000 p.s.i., and the diameter of said piston is 0.00240 to 0.00250 inch less than the bore of said cylinder.

8. A press according to claim 7 wherein said sample or particulate material is carbon black and said pressure providing means is a hydraulic cylinder activated by a power or hand operated pump capable of subjecting said carbon black to a pressure of 24,000 p.s.i.

9. A press according to claim 8 wherein the bore of said cylinder has a Rockwell hardness of 28–30 C., and the surface of said piston has a Rockwell hardness of 60 C.

References Cited

UNITED STATES PATENTS

| | | | |
|---|---|---|---|
| 1,822,939 | 9/1931 | Stout | 18—16.5UX |
| 2,996,759 | 8/1961 | Smith | 18—16.5X |

J. HOWARD FLINT, JR., Primary Examiner

U.S. Cl. X.R.

18—16.5